(12) United States Patent
Mutikainen et al.

(10) Patent No.: US 9,906,565 B2
(45) Date of Patent: Feb. 27, 2018

(54) METHOD, APPARATUS AND PROGRAM PRODUCT FOR MERGING COMMUNICATION SESSIONS IN AN IMS

(71) Applicant: Cellular Communications Equipment LLC, Plano, TX (US)

(72) Inventors: Jari Mutikainen, Lepsama (FI); Miikka Juhana Poikselka, Espoo (FI)

(73) Assignee: CELLULAR COMMUNICATIONS EQUIPMENT LLC, Plano, TX (US)

( * ) Notice: Subject to any disclaimer, the term of this patent is extended or adjusted under 35 U.S.C. 154(b) by 111 days.

(21) Appl. No.: 14/662,811

(22) Filed: Mar. 19, 2015

(65) Prior Publication Data
US 2015/0249691 A1    Sep. 3, 2015

Related U.S. Application Data

(63) Continuation of application No. 12/742,102, filed as application No. PCT/EP2008/064698 on Oct. 30, 2008, now Pat. No. 9,026,663.

(30) Foreign Application Priority Data

Nov. 13, 2007    (EP) .................................... 07022036

(51) Int. Cl.
*H04L 29/06*    (2006.01)
*H04L 29/08*    (2006.01)
(Continued)

(52) U.S. Cl.
CPC ...... *H04L 65/1016* (2013.01); *H04L 65/1006* (2013.01); *H04L 65/1086* (2013.01);
(Continued)

(58) Field of Classification Search
CPC .................................................... H04L 65/1016
(Continued)

(56) References Cited

U.S. PATENT DOCUMENTS 6,092,111 A       7/2000   Scivier et al.
7,145,994 B2 *   12/2006   Moreau ................... H04L 12/14
                                                                379/114.01
(Continued)

FOREIGN PATENT DOCUMENTS

CN        101035251 A       9/2007
WO     2006/010526 A1       2/2006
(Continued)

OTHER PUBLICATIONS

Al-Hezmi et al., "Enabling IMS with Multicast and Broadcast Capabilities", 2007.*
(Continued)

*Primary Examiner* — Ondrej C Vostal
(74) *Attorney, Agent, or Firm* — Procopio, Cory, Hargreaves & Savitch LLP

(57) ABSTRACT

The present invention relates to a session merging entity in a communication system IMS. The merging entity is handling communication of the first user; the communication comprises a first session and a second session. The first session and the second session are merged into a single session towards the second user, if the same IMS communication service identifier has been indicated for the first session and the second session. The merging entity may also be located at the terminal device of the second user.

23 Claims, 3 Drawing Sheets

(51) Int. Cl.
 H04L 12/66 (2006.01)
 H04L 29/12 (2006.01)
(52) U.S. Cl.
 CPC ............ *H04L 67/14* (2013.01); *H04L 67/146* (2013.01); *H04L 67/148* (2013.01); *H04L 12/66* (2013.01); *H04L 29/12764* (2013.01); *H04L 61/303* (2013.01)
(58) Field of Classification Search
 USPC ........................................................ 709/227
 See application file for complete search history.

(56) References Cited

U.S. PATENT DOCUMENTS

| | | | |
|---|---|---|---|
| 7,522,581 B2* | 4/2009 | Acharya | H04L 47/10 370/352 |
| 7,844,662 B2* | 11/2010 | Malik | G06Q 10/107 709/204 |
| 7,912,042 B2* | 3/2011 | Falkena | H04M 7/123 370/328 |
| 7,979,062 B2 | 7/2011 | Cotevino et al. | |
| 8,081,958 B2 | 12/2011 | Soderstrom et al. | |
| 8,213,434 B2* | 7/2012 | Gao | H04L 67/24 370/352 |
| 8,838,488 B1* | 9/2014 | Breau | G06Q 30/0185 705/34 |
| 9,026,663 B2* | 5/2015 | Mutikainen | H04L 65/1086 370/356 |
| 9,485,348 B2* | 11/2016 | Jeong | G06F 3/0486 |
| 2002/0068545 A1* | 6/2002 | Oyama | G06Q 30/0601 455/406 |
| 2003/0083938 A1 | 5/2003 | Smith et al. | |
| 2004/0078444 A1* | 4/2004 | Malik | G06Q 10/107 709/206 |
| 2004/0199580 A1 | 10/2004 | Zhakov et al. | |
| 2005/0034079 A1 | 2/2005 | Gunasekar et al. | |
| 2005/0152275 A1 | 7/2005 | Laurila et al. | |
| 2006/0035656 A1 | 2/2006 | Sung et al. | |
| 2006/0114847 A1 | 6/2006 | Dssouli et al. | |
| 2006/0155857 A1 | 7/2006 | Feenan et al. | |
| 2006/0212583 A1 | 9/2006 | Beadle et al. | |
| 2006/0221829 A1 | 10/2006 | Holmstrom et al. | |
| 2006/0291412 A1 | 12/2006 | Naqvi et al. | |
| 2007/0036312 A1* | 2/2007 | Cai | H04M 15/00 379/126 |
| 2007/0168523 A1 | 7/2007 | Jiang et al. | |
| 2007/0263615 A1* | 11/2007 | Zhu | H04W 76/025 370/356 |
| 2007/0280447 A1* | 12/2007 | Cai | H04M 15/00 379/114.03 |
| 2008/0065548 A1* | 3/2008 | Muijen | H04N 7/1675 705/51 |
| 2008/0089344 A1* | 4/2008 | Jansson | H04L 27/2601 370/395.2 |
| 2008/0132215 A1* | 6/2008 | Soderstrom | H04L 12/1818 455/416 |
| 2008/0155106 A1* | 6/2008 | Hans | H04L 12/185 709/227 |
| 2008/0219250 A1 | 9/2008 | Mutikainen et al. | |
| 2008/0239996 A1* | 10/2008 | Lohmar | H04L 12/1818 370/261 |
| 2008/0254816 A1 | 10/2008 | Sun et al. | |
| 2008/0285464 A1 | 11/2008 | Katzir | |
| 2008/0298353 A1* | 12/2008 | Zhu | H04W 76/025 370/356 |
| 2008/0311917 A1 | 12/2008 | Marathe et al. | |
| 2009/0040925 A1 | 2/2009 | Holmstrom et al. | |
| 2009/0068996 A1* | 3/2009 | Bakker | H04L 65/1016 455/414.1 |
| 2009/0094369 A1* | 4/2009 | Wooldridge | H04L 29/06027 709/228 |
| 2009/0215486 A1 | 8/2009 | Batni et al. | |
| 2009/0225760 A1* | 9/2009 | Foti | H04L 67/02 370/400 |
| 2009/0257433 A1* | 10/2009 | Mutikainen | H04W 36/0011 370/392 |
| 2010/0020790 A1 | 1/2010 | Pallares Lopez et al. | |
| 2010/0023625 A1* | 1/2010 | Lee | H04L 12/403 709/227 |
| 2010/0037161 A1 | 2/2010 | Stading et al. | |
| 2010/0100618 A1* | 4/2010 | Kuhlke | H04L 43/00 709/224 |
| 2010/0110978 A1* | 5/2010 | Falkena | H04M 7/0027 370/328 |
| 2010/0169495 A1* | 7/2010 | Zhang | H04W 36/0022 709/227 |
| 2010/0182955 A1 | 7/2010 | Bjork et al. | |
| 2010/0185772 A1 | 7/2010 | Wang et al. | |
| 2010/0223348 A1* | 9/2010 | Przybysz | H04L 65/1069 709/206 |
| 2010/0254372 A1 | 10/2010 | Keller et al. | |
| 2010/0257273 A1* | 10/2010 | Mutikainen | H04L 65/1086 709/227 |
| 2010/0324286 A1* | 12/2010 | Malefyt | A61K 31/4535 544/130 |
| 2011/0128907 A1 | 6/2011 | Kvernvik | |
| 2011/0134913 A1 | 6/2011 | Astrom et al. | |
| 2011/0161248 A1 | 6/2011 | Cai et al. | |
| 2011/0208799 A1* | 8/2011 | Labrogere | G06F 17/30887 709/203 |
| 2011/0222678 A1* | 9/2011 | Ge | H04M 3/42017 379/207.16 |
| 2011/0225307 A1* | 9/2011 | George | H04L 69/10 709/227 |
| 2011/0296041 A1* | 12/2011 | Jansson | H04L 27/2601 709/228 |
| 2013/0066978 A1* | 3/2013 | Bentley | H04L 12/1822 709/206 |
| 2013/0103798 A1* | 4/2013 | El Chami | H04L 65/1046 709/217 |
| 2013/0282744 A1* | 10/2013 | Hartman | H04M 3/5183 707/758 |
| 2015/0006741 A1* | 1/2015 | Narayanan | H04L 67/142 709/227 |
| 2015/0039775 A1* | 2/2015 | Benner | H04L 65/1006 709/228 |
| 2015/0334136 A1* | 11/2015 | Gao | H04M 7/006 709/228 |
| 2016/0226922 A1* | 8/2016 | Russell | H04L 65/1016 |
| 2017/0237782 A1* | 8/2017 | Shen | H04L 65/1073 455/435.1 |

FOREIGN PATENT DOCUMENTS

| | | | | |
|---|---|---|---|---|
| WO | WO 2007090235 A1 * | 8/2007 | ....... | H04L 29/06027 |
| WO | 2008/080297 A1 | 7/2008 | | |
| WO | WO 2008082203 A1 * | 7/2008 | .......... | H04L 12/189 |
| WO | 2010/017834 A1 | 2/2010 | | |

OTHER PUBLICATIONS

Bertrand, "The IP Multimedia Subsystem in Next Generation Networks", 2007.*
Calhoun et al., "Diameter Base Protocol", RFC 3588, 2003.*
Camarillo et al., "Integration of Resource Management and Session Initiation Protocol (SIP)", RFC 3312, 2002.*
Hallwachs, "Evaluation of the Fraunhofer Open Source IMS Core platform with special focus on the Call Session Control Function (CSCF)", 2007.*
Handley et al., "SDP: Session Description Protocol", RFC 2327, 1998.*
Handley et al., "SIP: Session Initiation Protocol", RFC 2543, 1999.*
Heiskanen, "Quality of Persion-to-Person Services in the Third Generation Partnership Project Architecture", 2005.*
Koukoulidis et al., "The IP multimedia domain: service architecture for the delivery of voice, data, and next generation multimedia applications", 2006.*

(56) References Cited

OTHER PUBLICATIONS

Merriam-Webster, "processor", 2014.*
Robart, "Is There a Future for Global Intelligent Network Standards?", 1997.*
Rosenberg et al., "SIP: Session Initiation Protocol", RFC 3261, 2002.*
Scalisi, "IMS Release 10 Tutorial", 2011.*
Willis et al., "Session Initiation Protocol (SIP) Extension Header Field for Service Route Discovery During Registration", RFC 3608, 2003.*
Yao et al., "A Survey of SIP in Distributed Systems", 2007.*
3GPP, "3rd Generation Partnership Project; Technical Specification Group Core Network and Terminals; 3GPP IMS Management Object (MO); Stage 3 (Release 6)", TS 24.167 V6.5.0, 2006.*
3GPP, "3rd Generation Partnership Project; Technical Specification Group Core Network and Terminals; IMS multimedia telephony communication service and supplementary services; Stage 3 (Release 7)", TS 24.173 V7.7.0, 2008.*
3GPP, "3rd Generation Partnership Project; Technical Specification Group Core Network and Terminals; IP multimedia call control protocol based on Session Initiation Protocol (SIP) and Session Description Protocol (SDP); Stage 3 (Release 14)", TS 24.229 V14.3.0, 2017.*
3GPP, "3rd Generation Partnership Project; Technical Specification Group Core Network and Terminals; IP multimedia call control protocol based on Session Initiation Protocol (SIP) and Session Description Protocol (SDP); Stage 3 (Release 7)", TS 24.229 V7.8.0, 2007.*
Camarillo et al., "Chapter 5 Session Control in the IMS", "The 3G IP Multimedia Subsystem (IMS): Merging the Internet and the Cellular Worlds", 3rd Edition, 2008.*
Klyne, "A Syntax for Describing Media Feature Sets", RFC2533, 1999.*
Rosenberg et al., "Caller Preferences for the Session Initiation Protocol (SIP)", RFC3841, 2004.*
Rosenberg et al., "Indicating User Agent Capabilities in the Session Initiation Protocol (SIP)", RFC3840, 2004.*
Rosenberg et al., "SIP: Session Initiation Protocol." RFC 3261, 2002.
Campbell et al., "The Message Session Relay Protocol (MSRP)", RFC 4975, 2007.
Tomic et al. "SIP meets ZigBee", 2007.
Gourraud, "Using IMS as a Service Framework", 2007.
Buono et al., "A Distributed IMS Enabled Conferencing Architecture on Top of a Standard Centralized Conferencing Framework", 2007.
Chatras et al., "Delivering Quadruple Play with IPTV over IMS", 2007.
Johnston et al., "Session Initiation Protocol (SIP) Call Control—Conferencing for User Agents", RFC 4579, 2006.
Keller provisional, 3GPP, "3GPP TR 23.892 v0.5.6 (May 2007)", 3rd Generation Partnership Project; Technical Specification Group Services and System Aspects; IP Multimedia System (IMS) services (Release 8), May 2007, filed as Keller U.S. Appl. No. 60/944,581.
Keller, U.S. Appl. No. 60/944,581 specification, "3GPP TSG W2 Architecture", Jun. 2007.
Loreto et al., "The Session Initiation Protocol (SIP) Same-Session Header Field", Feb. 2006.
Worley et al., "The References Header for SIP", Apr. 2012.
Qualcomm Europe, "Information flows for combined PS and CS origination and termination", 3GPP TSG SA WG2 Meeting #61, Ljubljana, Slovenia, Nov. 12-16, 2007, 3 pages.
ETSI TS 123 279, V7.7.0 (Oct. 2007), Digital cellular telecommunications systems (Phase 2+); Universal Mobile Telecommunications Systems (UTMS); Combining Circuit Switched (CS) and IP Multimedia Subsystem (IMS) services; Stage 2 (3GPP TS 23.279 V7.7.0, Release 7), 38 pages.
ETSI TS 123 228, V7.9.0 (Oct. 2007); digital cellular telecommunications systems (Phase 2+); Universal Mobile Telecommunications Systems (UTMS); IP Multimedia Subsystem (IMS); Stage 2 (3GPP TS 23.228 V7.9.0 Release 7), 228 pages.

* cited by examiner

METHOD, APPARATUS AND PROGRAM PRODUCT FOR MERGING COMMUNICATION SESSIONS IN AN IMS

CROSS REFERENCE TO RELATED APPLICATIONS

This is a continuation application of U.S. application Ser. No. 12/742,102 which is the U.S. National Stage application of PCT application PCT/EP2008/064698 filed on Oct. 30, 2008, which claims priority to European Patent Application No. 07022036.3 filed Nov. 13, 2007, and the contents of each of these applications are incorporated herein by reference in their entirety.

DESCRIPTION

Logic for Merging Communication Sessions

Technical Field of the Invention

The invention relates to a network entity, user equipment and a method for merging plurality of communication sessions from a first user into a single session towards a second user.

Background of the Invention

Within the IP (Internet Protocol) Multimedia Subsystem (IMS) as defined by 3rd Generation Partnership Project (3GPP) Session Initiation Protocol (SIP) defined by Internet Engineering Task Force (IETF) is used for controlling communication. SIP is an application-layer control protocol for creating, modifying, and terminating sessions with one or more participants. These sessions may include Internet multimedia conferences, Internet telephone calls, and multimedia distribution. Members in a session can communicate via multicast or via a mesh of unicast relations, or a combination of these.

Different types network entities and functions exist in the IMS network. Call Session Control Functions (CSCF) implement a session control function in SIP layer. The CSCF can act as Proxy CSCF (P-CSCF), Serving CSCF (S-CSCF) or Interrogating CSCF (I-CSCF). The P-CSCF is the first contact point for the User Equipment (UE) within the IMS; the S-CSCF actually handles the session states in the network; the I-CSCF is mainly the contact point within an operator's network for all IMS connections destined to a subscriber of that network operator, or a roaming subscriber currently located within that network operator's service area.

The functions performed by the I-CSCF are, for example, assigning an S-CSCF to a user performing SIP registration and routing SIP requests received from another network towards the S-CSCF. The S-CSCF performs the session control services for the UE. It maintains a session state as needed by the network operator for support of the services and may be acting as Registrar, i.e. it accepts registration requests and makes its information available through the location server (e.g. HSS). The S-CSCF is the central point to users that are hosted by this S-CSCF. The S-CSCF provides services to registered and unregistered users when it is assigned to these users. This assignment is stored in the Home Subscriber Server (HSS).

An Application Server (AS) is offering value added IP multimedia (IM) services to users of the IMS network and resides either in the IMS user's home network or in a third party location. The third party could be a network or simply a stand-alone AS. The AS may host and execute various services and can influence and impact a SIP session on behalf of the services. The IP multimedia Subsystem Service Control Interface (ISC) interface is between the S-CSCF and the service platforms (i.e. Ass). The ISC interface offers extended services to subscribers. ASs that are connected to the IMS are controlled via ISC interface. The protocol used on the ISC interface is the SIP.

A media gateway control function (MGCF) acts as an interworking point between a circuit switched (CS) network and an IP network in the control plane of the network. The MGCF controls the parts of the call state related to connection control for media channels in a media gateway (MGW), communicates with call state control, and performs protocol conversion between the call control protocols, such as SIP and ISUP.

Telephony Application Server (TAS) is a SIP-AS providing the network support for multimedia telephony services. Such services may include call forwarding, call transfer, conference call, call hold and other well known services from traditional circuit switched telephone networks.

The 3GPP is specifying multimedia session continuity (MMSC) which defines procedures for session continuity using SIP mechanisms. The MMSC is to include procedures where the UE moves from first access technology to second access technology, e.g. from wireless local area network (WLAN) to universal terrestrial radio access network (UTRAN), and the complete SIP session or part of the media components in the session continues seamlessly in the new access. Similar procedures should work also conjunction with voice call continuity (VCC), i.e. where the voice session is transferred from/to CS domain using VCC, but the SIP session is transferred using MMSC procedures. Also it should cover procedures where the sessions or media components in the session are transferred between multiple devices.

A session split/merge application server (AS) is a network entity responsible to represent a single SIP session towards the other end, even if the UE needs to use separate sessions in his end. The split/merge AS is also responsible to split and merge the session on fly in middle of the access transfer procedure. For example, if the UE is engaged in a SIP session in WLAN that includes voice over IP (VoIP) speech component and video sharing media, and the UE then moves from WLAN access to UTRAN access where VoIP is not possible or preferred, the UE should perform VCC procedure for the speech media, in order to transfer the speech to CS over UTRAN and transfer the video sharing SIP session to packet switched (PS) over UTRAN. The role of the split/merge AS in this scenario is to combine the speech and video sharing sessions after the access transfer and hide the session split from the UE in the other end. In other words, the UE in the other end may receive media updates (e.g. SIP re-INVITE requests) due to the access transfer, but the other end should not realize that the session has been split into two due to access transfer.

The split/merge AS should merge together the speech sessions it receives via MGCF, and SIP sessions it receives via P-CSCF, S-CSCF and present them as a single session towards the other end. The problem is that the split/merge AS should not merge the sessions that belong to different services. Otherwise the network is not able to route the sessions correctly to proper servers.

The object of the invention is to overcome the above problems.

SUMMARY OF THE INVENTION

The present invention overcomes the above problem by providing session handling entity, a method and a computer program, comprising:

handling communication of a first user, the communication comprising a first session and a second session, and handling the communication of the first session and the second session of the first user towards a second user and arranged to merge the first session and the second session into a single session towards the second user, if the same communication service identifier has been indicated for the first session and the second session. The communication may be handled using Session Initiation Protocol (SIP). Merging the first session and the second session may comprise re-negotiating an ongoing session to wards the second user.

During establishment of the second session, it may be determined that the session handling entity already maintains the ongoing session for the first user towards the second user, and the merging may comprise merging the second session into the ongoing session in response to the establishment of the second session. The ongoing session towards the second user may comprise media of the first session and the merging may add media of second session into the ongoing session.

The re-negotiation of the ongoing session may comprise transmitting a re-INVITE or an UPDATE request of Session Initiation Protocol (SIP).

The communication service identifier may comprise an IMS Communication Service Identifier (ICSI) or an IMS Application Reference Identifier (IARI) or an Open Mobile Alliance feature tag. The IMS Communication Service Identifier may is indicate IMS Multimedia Telephony service (MMtel).

The session handling entity may be implemented in a multimedia session continuity application server (MMSC AS), a session split and merge function (SSMF) an IMS centralized services application server (ICS AS) or an session initiation protocol application server.

The first session and the second session may carry different media types. The media types may be either speech, video, instant messaging, push-to-talk, file transfer or image sharing or other media.

The merging multimedia sessions may comprise controlling communication of a first user, the communication comprising a first session and a second session; determining if communication service identifiers are indicated for the first session and for the second session, and if the communication service identifiers for the first session and the second session are the same, merging the first session and the second session into a single session towards a second user.

The session handling entity may be implemented at a terminal device of the second user and the handling the communication towards the second user may comprise representing the merged sessions as a single application to the second user, if the first session and the second session are merged into the single session towards the second user.

The present invention has the advantage that it provides logic to merge sessions at the IMS network so as to continue the communication towards the other party in a single session, i.e. without the other party has to involve a new session. The invention defines the conditions when a session can be merged into an ongoing session and when this cannot be done. The merge logic should not merge the sessions that belong to different services, otherwise the problem would be that the network cannot route the sessions correctly to proper servers.

DESCRIPTION OF DRAWINGS

FIG. 3 illustrates the internal structure and functions of the split/merge AS.

DETAILED DESCRIPTION OF THE INVENTION

Figure 1:
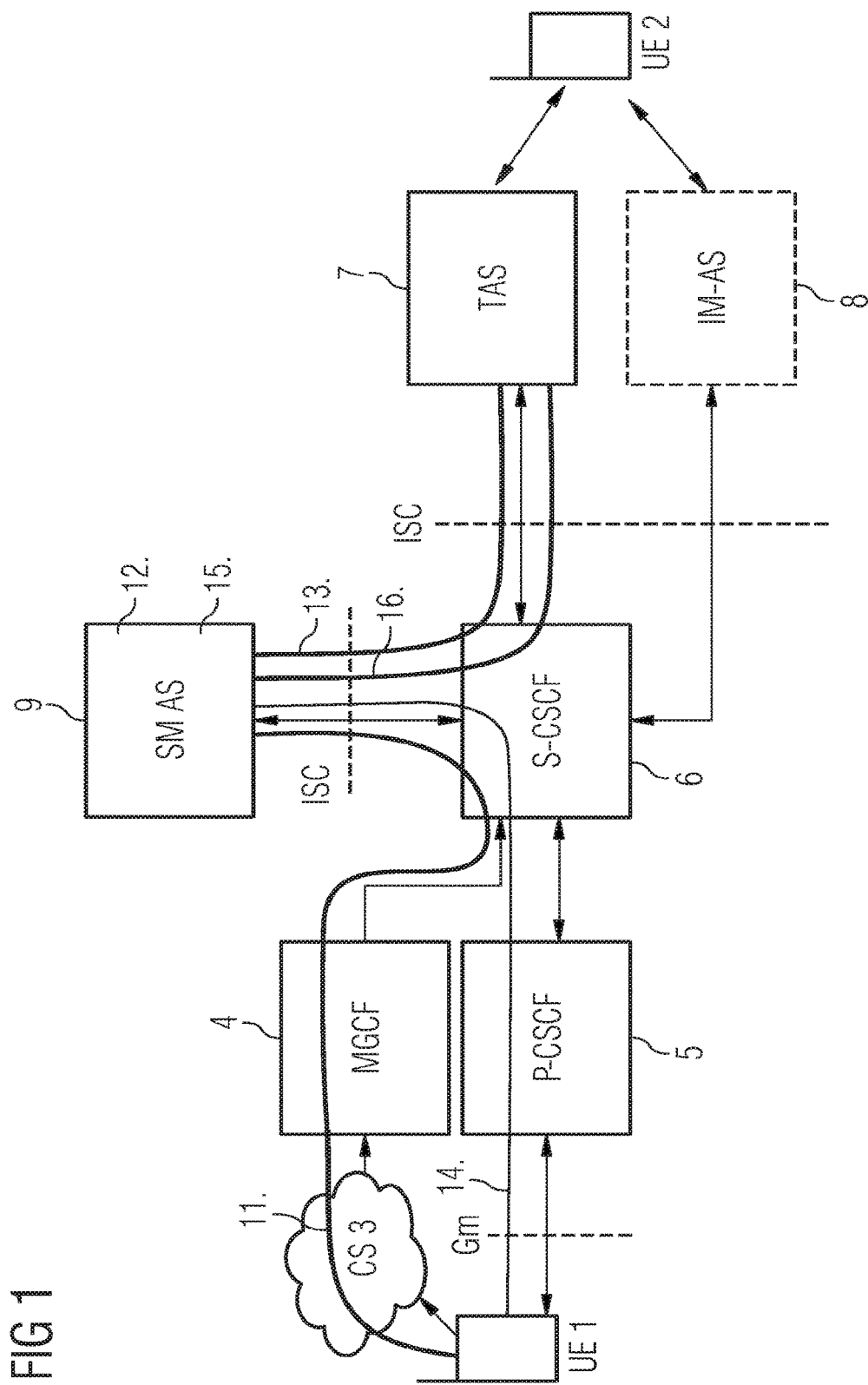
FIG. 1 illustrates an embodiment of the invention in which the split/merge AS decides to merge two sessions.

The 3GPP communication service identity framework defines an IMS Communication Service Identifier (ICSI) that may be used to indicate the requested service in the initial request of the IMS session. The ICSI is presented as Uniform Resource Name (URN). URN is a Uniform Resource Identifier (URI) that uses so-called urn scheme, and does not imply availability of the identified resource.

IMS Multimedia Telephony service (MMtel) is an example service that is having ICSI value. URN used to define the ICSI for the IMS Mutimedia Telephony Communication Service:

MMtel URN may be used to indicate that the device supports the IMS Multimedia Telephony Communication Service.

The network part of the MMtel service is implemented in a Telephony Application Server (TAS). An MMtel session may consist of multiple media components, for example audio, video, messaging (e.g. using messaging session relay protocol, MSRP), file transfer, image sharing, etc. All IMS sessions that include the ICSI value for MMtel should be routed to the TAS in order to execute the MMtel service in proper manner. Also public switched telephone network (PSTN) or CS network originated sessions shall be considered as an MMtel session which includes only audio as a media component, or both audio and video in case of a CS video telephony. For PSTN or CS network originated sessions an originating-MGCF includes the ICSI value for MMtel for sessions it initiates.

Open Mobile Alliance (OMA) has defined IMS services, for example instant messaging (IM), which consist of similar media than MMtel, except voice and video. OMA-IM does not use the ICSI framework, but has defined similar mechanism to identify the IM sessions. For this purpose OMA uses a dedicated feature tag. Also OMA-IM has a network server (IM AS) which implements the network part of the service and where the IM sessions need to be routed.

Multimedia session transfer is a transfer at the IMS-level of one or more of the session signalling paths and associated media paths of an ongoing multimedia session while maintaining session continuity. The multimedia session transfer incorporates both access network transfer and UE transfer. Multimedia session continuity is service of the IMS which supports the use of multimedia session transfer mechanisms in order to handle terminal mobility events and/or mobility between UEs for the case when such events are not hidden from the IMS session layer and thus session continuity could not otherwise be maintained. Access network transfer is a transfer at the IMS-level of both the signalling path and media path of an ongoing multimedia session on a UE from PS to CS domain or vice versa or between different IP connectivity access networks (IP-CAN).

In general, the continuity of multimedia services refers to the capability of continuing ongoing communication sessions with multiple media across different access networks or across different user equipments (UEs). The main need for such continuity arises because (i) UEs with multimedia capabilities can move across a multiplicity of different access networks or because (ii) the users can move the media of their communication sessions across different UEs to best meet their communication preferences. Transfer of a multimedia session to a different access network may lead to loss of synchronization across various media components (e.g. across voice and video components). The session continuity solution may take such synchronization issues into account for assuring the best user experience.

For the scenario of PS-PS multimedia session continuity:
All or some ongoing media components in the source access network are transferred to the target access network. If it is not possible or not desired (e.g. due to operator policies) to transfer all media, then part of the media components are transferred and the remaining component(s) are either released or kept. For example it may not be possible to transfer some media components to the target access network due to limited target access network capabilities. The selection of media to be transferred may depend on the solution used to realize the session transfer If possible and if allowed (e.g. by user preferences and/or operator policies) some media components may remain in the source access network.

The source and the target access network can include both 3GPP IP access systems and non-3GPP IP access systems (e.g. WiMAX).

After the UE hands over to the target access network the same or a different P-CSCF may be used. The solution for PS-PS multimedia session continuity should cope with both cases.

The PS-PS session continuity in conjunction with PS-CS continuity refers to a particular case of multimedia session continuity in which a session with media on both the CS domain and the PS domain is transferred to an access network supporting only packet switched (PS) communications, or vice versa. The transfer of the session is required due to user's movement from one access network (source) to another access network (target). The typical characteristic of this case is that one access network supports real-time media (usually voice) only on the CS domain (e.g. GERAN or UTRAN) whereas the other access network supports both real-time media and non-real-time media on PS bearers (e.g. E-UTRAN, Wi-MAX, or WLAN). To maintain a high-quality of user experience, the session is transferred to and continued on the target access network as seamlessly as possible.

For the scenario of PS-PS session continuity in conjunction with PS-CS continuity the following behavior may be relevant:
One access network (either the source or the target) supports voice on the CS domain only (such as UTRAN or GERAN), while the other access network supports voice and non-voice components on IP transport bearers (such as WLAN, WiMAX or E-UTRAN).

If the target access network supports voice on the CS domain only, then a voice component may be transferred to the CS domain and drop the remaining non-voice component(s).

If possible and if allowed (e.g. by user preferences and/or operator policies) some non-voice media components may remain in the source access network.

If the target access network supports video on the CS domain, then voice and video components may be transferred to the CS domain and all other components can be transferred to the PS domain.

If the target access network supports all media on IP transport bearers, then all media components active in the CS and PS domain of the source network may be transferred to IP transport bearers.

The invention proposes the split/merge AS to use ICSI for making a decision whether sessions are to be merged or not.

Therefore logic in the split/merge AS is introduced to determine an ICSI value in a received session, and if the ICSI matches to the ICSI in the existing session between the same users, then the decision is made to merge the sessions, otherwise the sessions are not merged.

Example scenarios are presented in following figures.

FIG. 1 presents a scenario where a UE 1 initiates, in signal 11, a circuit switched (CS) call towards the other end (e.g. UE 2) through a CS network 3. An S-CSCF 6 executes initial filter criteria (iFC) and a session split and merge application server (SM-AS 9) is allocated to the session path. The session path traverses the CS network 3 and an MGCF 4 to the split/merge AS 9 over ISC interface. However, it is to be noted that other ways exist to route a session setup from the UE 1 to the split/merge AS 9. For example, the session setup may pass through the MGCF 4 and an I-CSCF (not shown in the figure), instead of the S-CSCF 6. In step 12, the split/merge AS 9 determines that the session includes ICSI with value MMTel. In signal 13 the split/merge AS 9 passes the session further back to S-CSCF 6. The S-CSCF 6 continues iFC execution and the session is routed to TAS 7, which executes the actual service logic for multimedia telephony service. Later on during the voice call, in signal 14, the UE 1 initiates a video sharing session with the same other end (UE 2). UE 1 includes ICSI with value MMTel for the session. The session is routed through a P-CSCF 5 to the S-CSCF 6. The S-CSCF 6 executes the iFC and the session is routed to the split/merge AS 9. In step 15 the split/merge AS 9 determines that it maintains an existing session with the same participants (UE 1 and UE 2), and that the ICSI values of the existing session and the new (video sharing) session are equal. Thus split/merge AS 9 considers that the sessions belong together, and in signal 16, the split/merge AS 9 sends a re-INVITE towards the other end (UE 2). The re-INVITE is routed to S-CSCF 6 which then follows the existing path for the session, and routes the re-INVITE to the TAS 7. The TAS 7 executes the actual service for MMTel.

Figure 2:
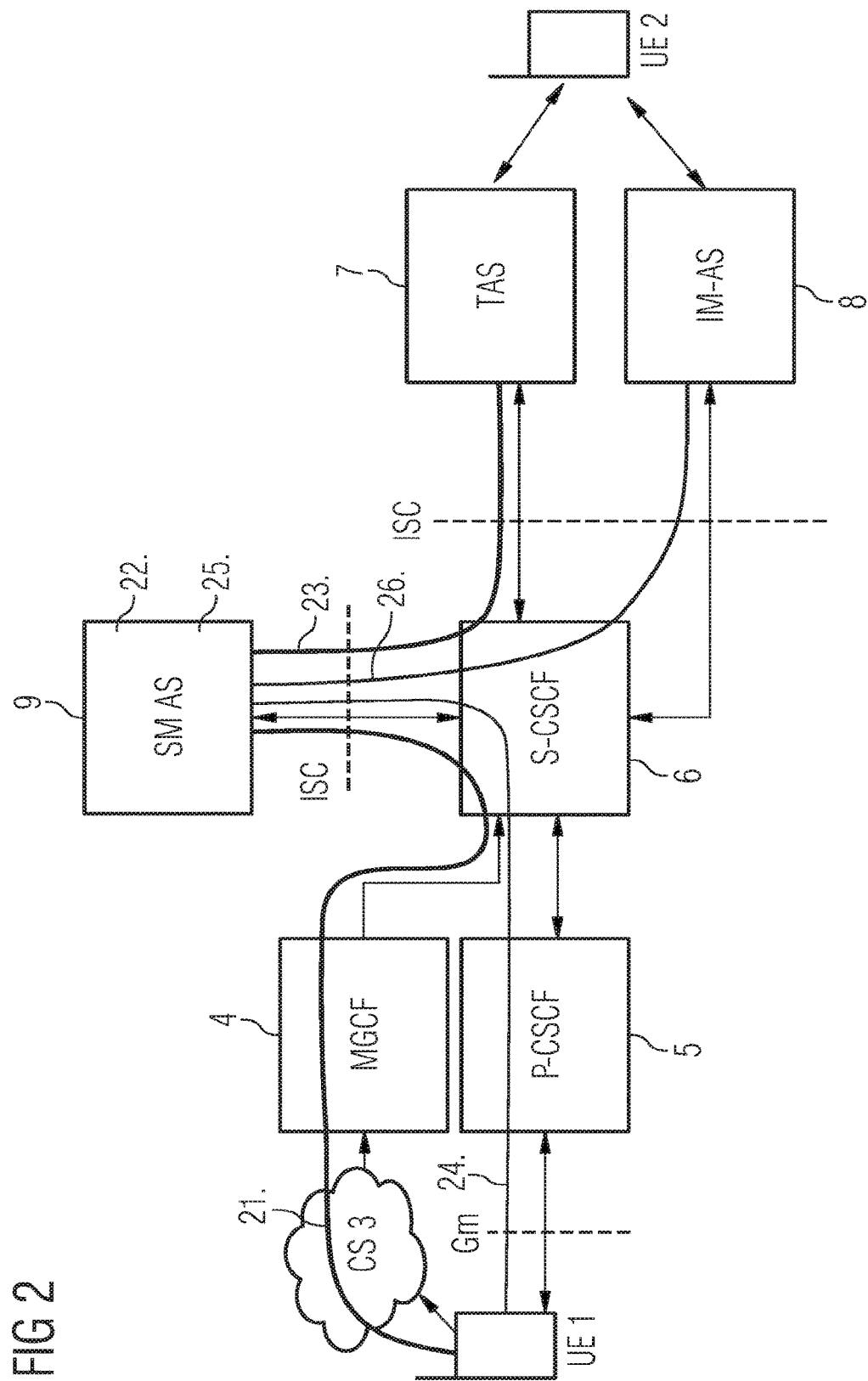
FIG. 2 presents an aspect of the invention in which the split/merge AS decides to keep two session separated.

FIG. 2 presents a scenario where the UE 1 initiates, in signal 21, a CS call towards the other end (UE 2). An S-CSCF 6 executes the iFC and an split/merge AS 9 is allocated to the session path. In step 22, the split/merge AS 9 determines that the session includes ICSI with value MMTel. In signal 23 the split/merge AS 9 passes the session further back to S-CSCF 6. The S-CSCF 6 continues iFC execution and the session is routed to a TAS 7, which executes the actual service logic for multimedia telephony service. Until this point the description of FIG. 2 corresponds to the description of FIG. 1. Later on during the voice call, in signal 24, the UE 1 initiates a file transfer session (difference to FIG. 1) with the same other end (UE 2). The UE 1 does not include ICSI value, but includes OMA IM indicator instead. The session is routed to the S-CSCF 6. The S-CSCF 6 executes the iFC and the session is routed to the split/merge AS 9. In step 25, the split/merge AS 9 determines that it maintains an existing session with the same participants (UE 1, UE 2), but that the ICSI values are different. In other words, the new request 24 does not include ICSI with value MMTel, but OMA IM indicator instead. The OMA IM indicator may replace ICSI in the same field. Thus the split/merge AS 9 considers the sessions do not belong together, and in signal 26 generates a new INVITE towards the other end (UE 2). The INVITE is routed to S-CSCF 6 which then executes the iFC for the new session and routes the INVITE to an OMA-IM AS 8. The IM-AS executes the actual service for OMA-IM service.

Thus, by determining the same ICSI for both sessions between the same endpoints the split/merge AS decides that the sessions can be merged towards the other end. If the ICSI values do not match, or one of the sessions does not have ICSI value (but instead may include e.g. OMA feature tag for identifying the service), the sessions are not merged.

In one aspect of the invention the sessions of a first user are to be merged towards a second user based on matching OMA feature tags indicating the same service.

In one aspect of the invention, a split/merge AS merges the sessions only if ICSI with value MMTel has been indicated for both sessions of the first user, i.e. for other matching ICSI (or OMA feature tag) values the sessions are not merged.

In one aspect of the invention and IMS Application Reference Identifier (IARI) values of the sessions of a first user are compared in a similar way as ICSI values above. The IARI is coded as a URN. The IARI URN may be included as a quoted string as a value of the g.ims.app_ref media feature tag. An example of a g.ims.app_ref media feature tag containing an IARI is:

In this aspect of the invention sessions of a first user are to be merged towards a second user based on matching IARI values.

Figure 3:
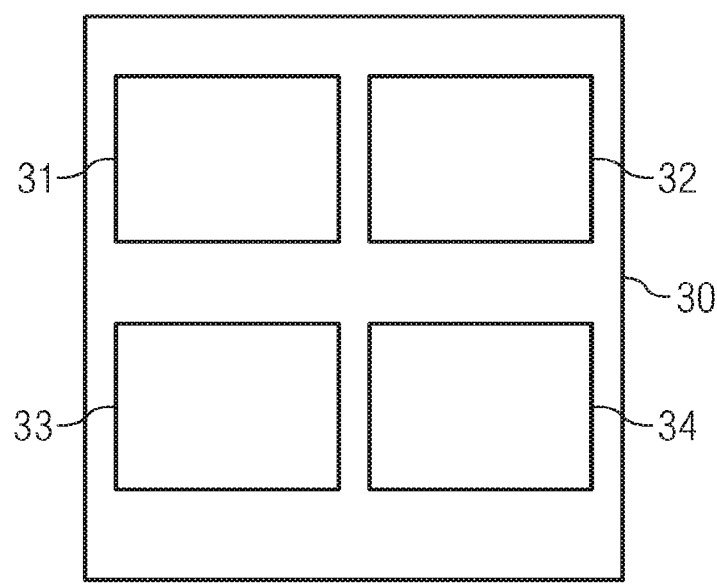

FIG. 3 presents the internal structure and functions of the network entity 30 implementing the session merge function, such as split/merge AS 9. The network entity 30 comprises a first session handling unit 31 configured to handle SIP sessions of a first user participating the communication. A second session unit 32 is configured to handle SIP sessions towards a second user participating the communication. The second session unit 32 is arranged to merge a session(s) handled by the first session unit 31 into a single session towards the second user. A determination unit 33 is configured to determine if an ICSI is indicated for a session handled by the first session handling unit 31. The ICSI may be present in a received SIP request. If the ICSI is detected the determination unit 33 is also configured to recognize the ICSI value. The network entity 30 comprises a maintaining unit 34 configured to maintain information about ongoing sessions in the network entity 30, participants of the sessions and possible ICSI values determined for the sessions. During establishing a new session, the determination unit 33 determines a possible ICSI value for the new session. If such is found, the maintaining unit 34 checks if there already exists an ongoing session with the same participants (i.e. users) and with the same ICSI value. If such a session is found, the second session unit 32 is merging the new session into the ongoing session towards the second user, i.e. towards the party from whose side the new request did not arrive. The second session unit 32 may merge the session by transmitting a SIP re-INVITE or a SIP UPDATE request which modifies the ongoing session by adding media components of the new session to the ongoing session. The determination unit 33 and maintaining unit 34 may detect, recognize and compare also OMA feature tags identifying OMA services or IARI values and order a session merge based on matching OMA feature tags or IARI values. The units described above may be implemented e.g using microprocessors and/or other electrical components and/or by software.

In one aspect of the invention, similar split/merge logic is implemented at user equipment (UE). The UE is having more than one ongoing SIP sessions towards the network, but based on matching ICSI, IARI or OMA feature tag values the UE may merge two or more of the session into a single session towards the user. The (end) user sees the merged session as a single application. This aspect has the benefit that even if the terminal device of the second user (e.g. UE 2 in FIG. 1) receives two sessions in signaling level, only one application is visible to the end user of the device (UE 2). The terminal device (UE 2) may merge the sessions internally even if the network does not support merge/split logic.

The invention is not limited to IMS networks, but may also be applied in other networks having similar session splitting and merging entity role as split/merge AS and in which networks various medias are used for communication. Therefore, the split/merge AS is only used here as an example of an entity responsible for handling session merging. A Session Split and Merge Function (SSMF), a Multimedia Session Continuity Application Server (MMSC AS) and an IMS Centralized Services Application Server (ICS AS) are further examples of network nodes which may implement session splitting and merging operations according to this invention. Functions of the split/merge AS described above may be implemented by code means, as software, and loaded into memory of a computer.

The invention claimed is:

1. A method, comprising:
controlling, with a merging entity having at least one microprocessor, communication of a first user and a second user, the communication comprising a first session and a second session;
determining, with the merging entity, if communication service identifiers, comprising an internet protocol multimedia subsystem (IMS) communication service identifier, are indicated for the first session and for the second session, the IMS communication service identifiers identifying a type of communication service in use by the first session and the second session;
determining whether communication service identifiers indicated for the first session and for the second session are the same IMS communication service identifier; and
merging the first session and the second session into an existing session between the first user and the second user based on determining that the communication service identifiers for the first session and the second session are the same,
wherein the merging entity is implemented in a user equipment of the first user or the second user.

2. The method of claim 1, further comprising using session initiation protocol to control the communication of the first user and the second user.

3. The method of claim 1, wherein the first session comprises a first media type different from a second media type of the second session.

4. The method of claim 1, further comprising:
determining, during establishment of the second session, existence of an ongoing session between the first user and the second user; and
merging the second session into the ongoing session.

5. The method of claim 4, wherein merging the second session into the ongoing session comprises re-negotiating the ongoing session.

6. The device of claim 5, wherein re-negotiating the ongoing session comprises transmitting a re-INVITE or an UPDATE request of session initiation protocol.

7. The method of claim 1, wherein the existing IMS session between the first user and the second user comprises an ongoing session having media of the first session and the merging adds media of second session into the ongoing session.

8. The method of claim 1, wherein the IMS communication service identifier comprises an IMS Application Reference Identifier (IARI).

9. The method of claim 1, wherein the IMS communication service identifier comprises an IMS Communication Service Identifier (ICSI).

10. The method of claim 9, further comprising determining that the IMS communication service identifier indicates IMS Multimedia Telephony Service (MMtel).

11. The method of claim 1, wherein IMS communication service identifier comprises an Open Mobile Alliance (OMA) feature tag.

12. The method of claim 1, wherein merging the first session and the second session into an existing IMS session between the first user and the second user comprises implementing logic at user equipment of one of the first user and the second user to represent the merged sessions as a single application.

13. A device comprising:
a merging entity having at least one microprocessor, configured to control communication between a first user equipment and a second user equipment via a wireless network, the communication comprising a first session and a second session; and
the merging entity comprising at least one processor, the at least one processor operable to
determine if communication service identifiers comprising an internet protocol multimedia subsystem (IMS) communication service identifier are indicated for the first session and for the second session, the IMS communication service identifiers identifying a type of communication service in use by the first session and the second session,
determine whether communication service identifiers indicated for the first session and for the second session are the same IMS communication service identifier, and
merge the first session and the second session into an existing IMS session between the first user equipment and the second user equipment based on determining that the IMS communication service identifiers for the first session and the second session are the same IMS communication service identifier,
wherein the merging entity is implemented in a user equipment of the first user or the second user.

14. The device of claim 13, wherein the at least one processor is further configured to control the communication between the first user equipment and the second user equipment using session initiation protocol.

15. The device of claim 13, wherein the first session comprises a first media type different from a second media type of the second session.

16. The device of claim 13, wherein the at least one processor is further configured to:
determine, during establishment of the second session, existence of an ongoing session between the first user equipment and the second user equipment; and
merge the second session into the ongoing IMS session.

17. The device of claim 16, wherein the at least one processor is further configured to re-negotiate the ongoing session to merge the first session into the ongoing session.

18. The device of claim 17, wherein re-negotiating the ongoing session comprises transmitting a re-INVITE or an UPDATE request of session initiation protocol.

19. The device of claim 13, wherein the existing IMS session between the first user equipment and the second user equipment comprises an ongoing session having media of the first session and the merging adds media of second session into the ongoing session.

20. The device of claim 13, wherein the communication further comprises at least one additional session, and
wherein the at least one processor is further configured to merge the at least one additional session into the existing IMS session.

21. The device of claim 13, wherein the IMS communication service identifier comprises one of an IMS Communication Service Identifier (ICSI), an Open Mobile Alliance (OMA) feature tag and an IMS Application Reference Identifier (IARI).

22. The device of claim 13, wherein the IMS communication service identifier is an IMS Communication Service Identifier (ICSI), and the at least one processor is further operable to:
determine that the IMS Communication Service Identifier indicates IMS Multimedia Telephony service (MMtel).

23. The device of claim 13, wherein the merging entity comprises a terminal device of one of the first user equipment and the second user equipment and wherein the merging the first session and the second session into the existing IMS session between the first user equipment and the second user equipment comprises representing the merged sessions as a single application.

* * * * *